Patented Dec. 4, 1934

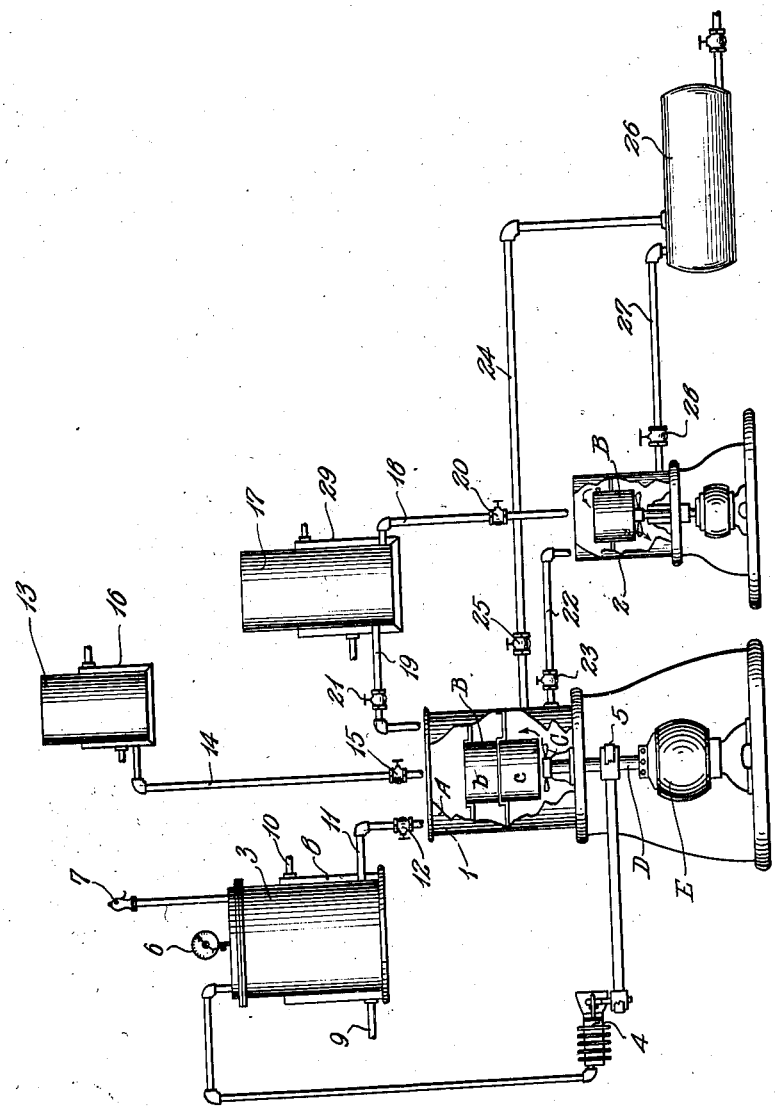

1,983,319

UNITED STATES PATENT OFFICE 1,983,319

APPARATUS FOR MAKING FACIAL AND MASSAGE CREAM

John French Simpson, Washington, D. C., assignor to Ensemble Manufacturing Company, Inc., Washington, D. C., a corporation of Delaware Refiled for abandoned application Serial No. 379,311, July 18, 1929. This application September 29, 1932, Serial No. 635,466

8 Claims. (Cl. 259—64)

This application is filed for the invention disclosed in application Serial No. 379,311, filed July 18, 1929, which became abandoned October 1, 1932.

Referring to the drawing in detail, 1 designates an emulsifier composed of the outer receptacle A, inner compartment B, here shown in two sections $b$ and $c$, propeller C, a shaft D, running from the motor E, and the supporting member F. 2 designates a second emulsifier, shown of the same type as the emulsifier 1 except that the part B in the second emulsifier need not be divided into two sections.

3 is a receptacle or charging tank for the animal hydrous-fat used as the base and this is provided with a compressor 4 with some means for operating the same, such as a belt connection 5, pressure gauge 6 and pressure control valve 7. A tank jacket 8 is also provided for the tank 3, as well as an inlet 9 and outlet 10 for the circulation of a temperature-controlling medium. A drawoff line 11 runs from the tank 3, discharging into the top of the emulsifier 1 and the flow is regulated by a valve 12.

13 designates a storage tank for the feeding of a mixture of water, preservatives and perfume into the emulsifier through the pipe 14 controlled by a valve 15. The tank 13 is provided with a jacket 16 for a temperature controlling medium. A tank 17 serves as a storage tank for the vegetable oil, or mixture of one or more vegetable oils, which tank has outlets 18 and 19 leading to the emulsifier 2 and the emulsifier 1 respectively, and controlled by the valves 20 and 21.

An outlet pipe 22 runs from the emulsifier 1 to the emulsifier 2 and controlled by the valve 23. An outlet pipe 24, controlled by the valve 25, runs from the emulsifier 1 directly to a final storage tank 26, and an outlet 27 controlled by a valve 28 as shown, and which pipe 27 runs also into the final storage tank 26. The tank 17 is also provided with a jacket 29 regulating the temperature of the material contained therein.

The above apparatus may be either run for a batch, or a continuous process.

The batch process is as follows:

The upper section $b$ of the inner compartment B of the emulsifier 1 is removed. Both the sections $b$ and $c$ are tubular, of the same size, open at top and bottom to allow circulation down through the same when the contents of the mixer rises above the top of the section. From the tank 3 a charge of hydrous animal fat such for instance as tallow or its equivalent, is let into the mixer and because of its viscosity in its commercial form may be forced through the pipe 11 by means of a built-up pressure on top of the tank 3, which is a closed tank, and provided with air compression and relief or release control 7. A small quantity of glycerine is then added to the mixer as a preservative. The quantity of animal fact should fill the mixer to about half way up to the top of the section $c$. The propeller C is then started and is rotated so as to pull the contents from inside the section $c$ and send it up between said section and the outer wall A to be circulated over the top of the section $c$ and down inside again and again. To the animal fat in the mixer is then added approximately a like quantity of water which has been mixed in the tank 13 with a small quantity of borax. When this has been added, the liquid level in the mixer will be above the top of the section $c$ and will circulate as described above. Thus, in a short time, forming a smooth viscous emulsion, the viscosity of which is regulated by the heating of the materials in their respective charging tanks 3 and 13, before introduction into the mixer.

The mixer may also be provided with means for heating, not shown.

To the contents of the mixer is then added a vegetable oil or a mixture of one or more vegetable oils such as cotton seed oil and others, which is heated to the desired temperature in the tank 17 and let into the mixer through the line 19 and valve 21. The various tanks may be provided with thermometers, not shown, for an obvious purpose.

In some cases it is more desirable to hydrate the animal fat in the mixer 1 with the water, borax, perfume, etc., from the tank 13 and then let this mixture feed into the mixer 2 through the line 22 and the valve 23 and be emulsified in the mixer 2 with the vegetable oil contents of the tank 17 let into the mixer simultaneously through the line 18 and the valve 20. The finished product goes through the line 24 or 27 to a tank 26 from where it is put into jars for the market.

The continuous process is as follows:

A batch is made up as above described in the mixer 1 and the section $b$ is fastened in place. By the addition of section $b$ to section $c$ of the inner compartment upon completion of the initial emulsion batch, the device is thus brought to assembly to carry out an operation in the continuous phase for the production of my stable, homogeneous emulsion. By thus lengthening the inner compartment, the necessary correlation between the density and change in viscosity of material during working is taken care of. In other words, in such continuous operation, the depth of circulating body must be proportional to the cross sectional area of the container, and by thus altering the length of the inner compartment during such operation, this necessary relationship is assured. Valves 21, 15 and 12 are opened and so regulated as to allow the proper amount of the three mixtures or materials to flow per minute as will be their respective proportions in the final product. As these streams are fed to the mixer a like quantity of the finished product is drawn off through the outlet line 24, controlled by the valve 25, and passed to the tank 26.

It is well known in practice to take a mineral oil, like petroleum jelly and mix it with the same, quantities of vegetable oil or oils, but such mixture is not an emulsion and such preservatives as benzoate of soda and others which are harmful to the skin, are necessary, and although it may be desirable to use harmless preservatives it is prohibitive in such mixtures because they will not properly mix and form a smooth, homogeneous and solid enough product.

In my process, all such difficulties are eliminated and because the base product is in itself an emulsion of water and animal fat, and not a mineral oil, other materials of almost any nature, such as water, materials soluble in water, oils, greases, etc., may be emulsified into this emulsion as a base and when properly added will form a most desirable facial and massage cream substantially as described.

The process carried out by the apparatus hereinbefore described involves, broadly, the emulsification of an animal fat, and subsequent admixing therewith of a vegetable oil and forming a second emulsification.

It also contemplates the successive steps of emulsifying an animal fat or fats and subjecting the same to subsequent treatment in the presence of a non-animal fat.

In view of the invention and disclosure herein made, variations and modifications to meet individual whim or particular need will doubtless become evident to others skilled in the art, to obtain part or all of the benefits of my invention, without copying the structure shown, or the process outlined, and I therefore claim all such insofar as they fall within the reasonable spirit and scope of the invention herein disclosed.

I claim as my invention:

1. In an apparatus for making massage cream, the combination with two emulsifiers, of supply tanks for the different ingredients, means for regulating the temperature of the ingredients in the supply tanks, means for regulated feeding from certain supply tanks to the first emulsifier, means for regulated feeding from other supply tank or tanks, to the second emulsifier, means for regulated feeding from the first emulsifier to the second, and means for drawing off the finished product from the second emulsifier.

2. In an apparatus for making massage cream, two emulsifiers, supply tanks for different ingredients, means for supplying emulsified material from one of said emulsifiers to the other, means for regulating the temperature of the ingredients in the supply tanks, means for regulated feeding from the supply tanks to the emulsifiers, and means for drawing off the emulsion from the emulsifier, each of said emulsifiers having an inner tube to induce circulation.

3. In an apparatus for making massage cream, etc., two emulsifiers, each with an inner tubular member to induce circulation, the said member in one of the emulsifiers being in tubular sections, a source of supply for each emulsifier, and an outlet from one emulsifier to the other.

4. In an apparatus for making massage cream, etc., a multiplicity of emulsifiers, one of which is provided with an inner member serving to induce circulation, means for feeding ingredients individually to each emulsifier, means for feeding emulsified material from one of said emulsifiers to the other, means within one of the emulsifiers for inducing circulation, and means for regulating the temperature of the ingredients before the same are introduced into the emulsifiers.

5. In an apparatus for making massage cream, the combination with two emulsifiers, of supply tanks for the different ingredients, means for regulating the temperature of the ingredients in said supply tanks, an additional supply tank, means for regulated feeding from the first named supply tanks to the first named emulsifier, and means for regulated feeding from the last named tank to the first named emulsifier.

6. An apparatus for the continuous manufacture of stable emulsions of skin creams which comprises, a container into which a batch of materials to be emulsified is initially introduced, an open-ended cylinder vertically disposed within said container in spaced relation to the walls and base of the container, said cylinder comprising a plurality of separable sections one of which is removed when the initial batch of material is introduced, means disposed within said container for producing agitation of said materials, means associated with said latter means for forcing said materials upwardly between the cylinder and walls of the container and downwardly through said cylinder whereby to produce a directional cyclic circulation, said removed section of the cylinder being replaced after the initial batch has been emulsified, means for thereafter continuously feeding materials to said container to be emulsified, and means for removing the emulsified product at substantially the same rate as the raw materials are charged to the container.

7. An apparatus for the continuous manufacture of stable emulsions of skin creams which comprises, a container into which a batch of materials to be emulsified is initially introduced, an open-ended cylinder vertically disposed within said container in spaced relation to the walls and base of the container, said cylinder comprising a plurality of separable sections one of which is removed when the initial batch of material is introduced, means disposed within said container for producing agitation of said materials, means associated with said latter means for forcing said materials upwardly between the cylinder and walls of the container and downwardly through said cylinder whereby to produce a directional cyclic circulation, said removed section of the cylinder being replaced after the initial batch has been emulsified, means for thereafter continuously feeding materials to said container to be emulsified, comprising a plurality of valved raw material charging pipes leading into said container, and a valved discharge pipe connected to the container wall for continuously removing the emulsified product at substantially the same rate as the raw materials are charged to the container.

8. An apparatus for the continuous manufacture of stable emulsions of skin creams which comprises, a container into which a batch of materials to be emulsified is initially introduced, an open-ended cylinder vertically disposed within said container in spaced relation to the walls and base of the container, said cylinder comprising a plurality of separable sections one of which is removed when the initial batch of material is introduced, means disposed within said container for producing agitation of said materials, means associated with said latter means for forcing said materials upwardly between the cylinder and walls of the container and downwardly through said cylinder whereby to produce a directional cyclic circulation, said removed section of the cylinder being replaced after the initial batch has been emulsified, means for thereafter continuously feeding materials to said container to be emulsified, a plurality of supply tanks for the raw materials to be emulsified, a plurality of raw material valved charging pipes leading from said plurality of supply tanks into said container, a valved discharge pipe connected to the container wall for continuously removing the emulsified product at substantially the same rate as the raw materials are continuously charged to the emulsifier, and means individual to each supply tank for regulating the temperature of the raw materials contained therein.

JOHN FRENCH SIMPSON.